Jan. 24, 1928.
E. E. SCOVILL
MUSIC EDUCATIONAL APPLIANCE
Filed Feb. 10, 1926
1,657,137
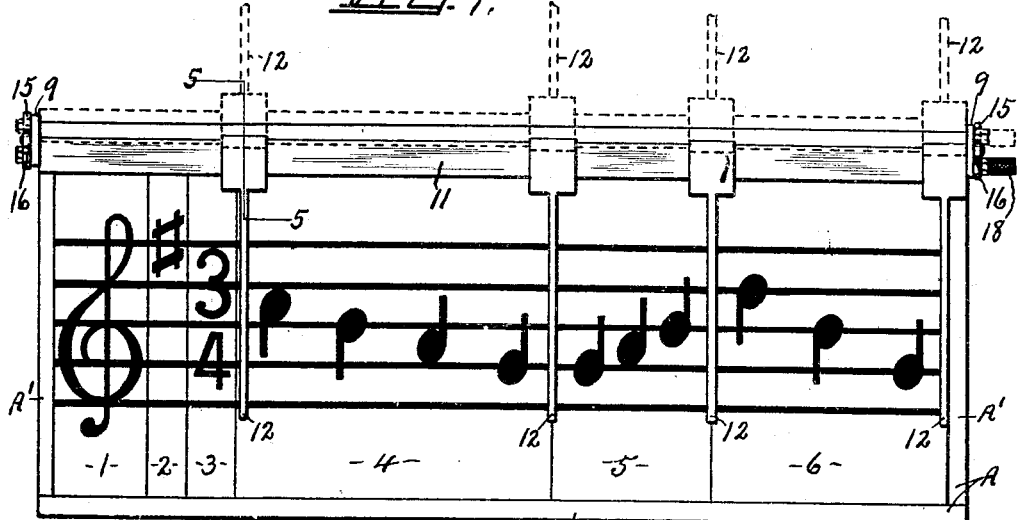
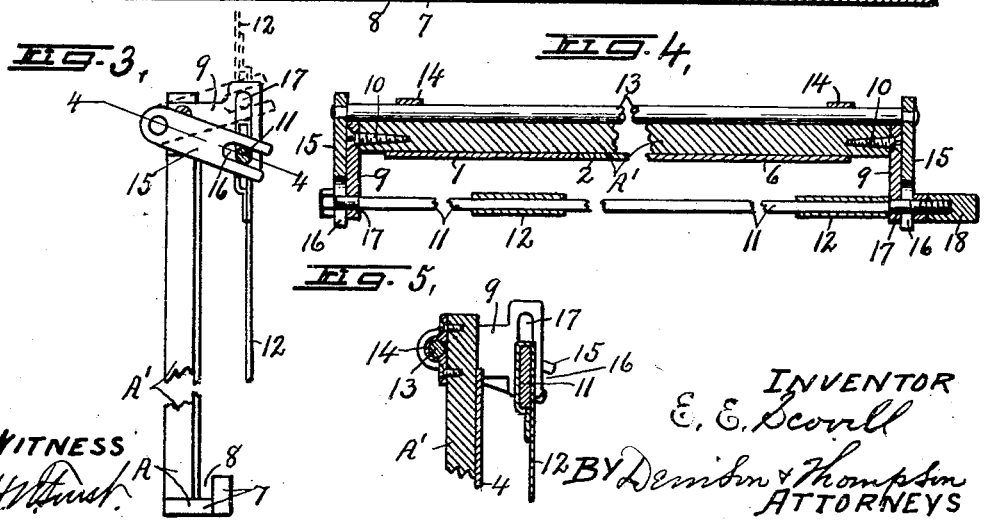
INVENTOR
E. E. Scovill
BY Denton & Thompson
ATTORNEYS
WITNESS Patented Jan. 24, 1928.

1,657,137

UNITED STATES PATENT OFFICE.

EDWARD E. SCOVILL, OF AUBURN, NEW YORK.

MUSIC EDUCATIONAL APPLIANCE.

Application filed February 10, 1926. Serial No. 87,356.

This invention relates to an educational appliance for teaching music adapted to be used in public schools and analogous places where it is necessary to instruct the pupils in class, but it will be evident that the same apparatus may be used by private teachers for the instruction of individuals in the fundamental or underlying principles of music.

The main object is to provide a simple device whereby the pupil may be taught to read music in groups or phrases in a staff under different clef, key, and time signatures as distinguished from the usual method of teaching the meaning of the different individual notes in different positions on the staff and separate instruction in the meaning of the different symbols indicating the different clefs, different keys and different time indicia.

One of the specific objects is to provide a series of reversible and invertible cards having obverse and reverse sides bearing the usual five staff lines, one of said cards having upon its opposite sides different clef signals, another card having upon its opposite sides different key signatures, another one or more of the cards bearing upon its opposite sides different time signatures while the remaining cards bear upon their opposite sides groups of notes differently positioned on the staff so that by inverting and reversing either card, four different groups of notes may be presented for instruction.

Another object is to provide the device with measure bars which may be adjusted to different positions along the staff for including a greater or less number of the notes of the several cards between them.

Another object is to enable all of the measure bars to be adjusted to and from a position across the staffs of the several note cards so that when displaced the cards may be more conveniently interchanged, reversed, and inverted or overlapped one upon the other.

Another object is to provide the apparatus with means for supporting the several cards in such manner that their respective staff lines will be horizontally alined.

A further object is to enable the cards to be used upon the display board or support for tone drill and contrasts, motive drill and contrasts, phrase drill and contrasts, accent, beat and measure drill and contrasts, rhythm drill and contrasts, tetrachord and chord drill and contrasts, all contributing to expedite sight recognition and reading of various groups under their beat signatures as to clef, key and time and also facilitating the singing of the music language in a manner somewhat parallel to the sight recognition of a spoken language.

This device may also be used to indicate at will any change of position, key, scale, beat of the tone group, motif, measure, phrase, accent and also the measure position of the tone group and change of rhythm.

Furthermore by the use of this device the measure may be shortened or lengthened or the speed may be increased or diminished at will.

Other objects and uses relating to specific parts of the device will be brought out in the following description.

In the drawings:—

Figures 1 and 2 are each a face view of a music educational appliance showing the obverse and reverse sides of a limited number of cards adapted to be used in connection therewith and each having different musical indicia impressed on its opposite faces.

Figure 3 is a transverse vertical sectional view of the same device, partly broken away.

Figure 4 is a horizontal sectional view, partly broken away, taken in the plane of line 4—4, Figure 3.

Figure 5 is an enlarged detail sectional view taken on line 5—5, Figure 1.

As illustrated, this appliance comprises a display board A of any suitable height or length convenient for handling and transportation from one place to another but capable of receiving and supporting edge to edge an indefinite number of cards such, for example, as the clef card —1—, a key card —2—, a time card —3— and any suitable number of note cards —4—, —5— and —6— each bearing upon its opposite faces different musical indicia hereinafter more fully described.

The display board A is provided along its lower edge with a horizontal ledge —7— having a lengthwise groove —8— adjacent to the upright back section A', said groove being adapted to receive the lower edges of the cards and to support said cards in an upright position resting against the back portion A'.

This display board is preferably of considerably greater length than height and is provided near its upper edge with opposite end brackets —9— secured thereto by screws —10— and projecting forwardly beyond the front face of the back portion A' for receiving and guiding the opposite ends of a vertically movable lengthwise bar —11— carrying a plurality of, in this instance, four spacing bars —12— shown more clearly in Figures 1, 3 and 5 for dividing the notes on the cards into different groups.

A rock shaft —13— is journaled in suitable bearings —14— on the back of the board A' near the upper edge thereof and is provided at its opposite ends with forwardly projecting arms —15— rigidly secured thereto and adapted to move vertically in close proximity to the outer faces of the brackets —9—, the front ends of said arms being slots or bifurcated at —16— to receive the adjacent ends of the lengthwise bar —11—.

The brackets —9— are provided near their front ends with vertical slots —17— in which the adjacent ends of the bar —11— are movable to and from a position in front of the upper edges of the cards 1, 2, 3, 4, 5 and 6 when the latter are resting in the groove —8— of the ledge —7— and permitting said cards to be more easily removed by hand when the bar —11— is elevated to the position shown by dotted lines in Figure 3.

The portions of the bar —11— passing through the brackets —9— and arms —15— are preferably cylindrical but the remaining portions between the brackets —9— are angular or flat in cross section.

The upper ends of the bars —12— are slightly elongated lengthwise of the bar —11— and are provided with annular sockets therethrough corresponding to the cross sectional area of the bar —11— for receiving said bar and permitting the bars —12— to move therewith.

One end of the bar —11— outside of the corresponding arm —15— is provided with a handle —18— by which the entire bar with the bars —12— thereon may be elevated along the slots —17— and rotated to shift the bars —12— to and from a position across the front faces of the cards or from the position shown by full lines in Figures 1 and 3 to the positions shown by dotted lines in the same figures.

The cards 1, 2, 3, 4, 5 and 6 are of uniform height slightly greater than the distance between the ledge —7— and rod —11— when the latter is in its normal down position whereby the rod which extends along the front face of the cards near the upper edge thereof cooperates with the front edge of the ledge —7— in holding the cards against forward displacement by permitting them to be displayed by hand from the top forwardly and downwardly by simply lifting the rod —11— upwardly to the upper end of the slot —17— and then rocking said shaft about its axis to move the bars 12 above the horizontal plane of the shaft —13—.

As previously stated the bars —12— are looped around the flat supporting bar —11— to hold the fingers and bar against relative rotation and also to permit the bars to be shifted along the bar and, therefore, along the staff on the cards for varying the number of notes which may be included in any group as may be desired.

The individual adjustability of the bars relatively to each other along the staff permits the notes of any one or more or all of the cards to be divided into similar or different groups of two or more notes in each group.

That is, the same notes, either with or without the accompanying clef, key and time symbols may, by the adjustment of the bars —12—, be divided into a large variety of different tone groups or phrases designated by as many different musical terms, all of which may be readily imparted to the pupil under proper instruction with the result that the pupil learns to read music languages in groups or phrases of various rhythms in a manner very similar to the reading of the spoken language and at the same time obtains a more accurate conception of each tone by reason of its association with other tones of any group.

After a sufficient amount of drill has been given upon the various groupings and phrasings of one particular display of tones under specific clef, key and time signatures, any one of these signatures may be changed by simply reversing its corresponding card and the tonal grouping instruction carried on as before in different groupings of the same notes under the changed clef, key or time or under changes of all of these signatures.

After sufficient instruction has been given in the grouping of the same notes under one display, either one or all of the cards may be reversed end for end for displaying a different combination of notes which may, by the adjustment of the bars —12—, be also divided into a large number of different groups under the same or different clef, key or time signatures.

In addition to the reversal of any one or all of the cards for displaying different combinations of notes one or more or all of the cards may be inverted to display the groups of notes on either face and thereby to produce still further and different combinations of notes, it being understood that, as illustrated, the staff lines are arranged substantially midway between the lower and upper edges of the cards so that when any one card is inverted or reversed its staff lines will register with those of the remaining cards.

It will also be evident that under the construction described the cards may be overlapped or interchanged to produce other different combinations which may also be divided into various groups by proper adjustment of the bars —12—.

It is evident that cards bearing different time symbols may be substituted for or superposed upon those shown and that other tone cards bearing different groups of notes may be substituted for or upon those shown and, when necessary, cards bearing different notes, time or clef symbols may be placed wherever necessary along the staff in proper association with any note of any group within the scope of my invention which contemplates the use of cards bearing the most important individual tone groups and other musical indicia within the musical nomenclature and too numerous to herein illustrate or describe.

What I claim is:

1. In a music educational appliance, a staff bearing element, and bars adjustable along the staff for dividing it into measures.

2. In a music educational appliance, a staff bearing element, and bars adjustable along the staff for dividing it into measures, said bars being adjustable to and from a position across the staff.

3. In a music educational appliance, a staff bearing element, a guide extending along said element, and bars adjustable along the guide for varying the length of the measures on the staff, said bars being removable endwise from the guide.

4. In a music educational appliance, a staff bearing element, a guide extending along said element, and bars adjustable along the guide for varying the length of the measures on the staff, said bars being removable endwise from the guide, and means for moving the guide about an axis for simultaneously shifting the bars to and from a position across the staff.

5. In a music educational appliance, a music staff and a plurality of notes along the staff in combination with a plurality of devices separately adjustable along the staff for dividing the notes into different groups.

6. In a music educational appliance, a plurality of cards having staff lines and note groups on their respective staff lines in combination with means for supporting the cards edge to edge with their staff lines in alinement, said cards being relatively adjustable endwise to permit their positions to be interchanged for changing the relation of their note groups.

7. In a music educational appliance of the character described, a plurality of cards having staff lines and different groups of notes impressed upon opposite faces thereof, and means for supporting the cards with their staff lines in registration, each card being reversable on the support independently of the other cards for changing the combinations of note groups, the staff on opposite faces of each card being equal distances from the lower and upper edges thereof to permit them to register with the staff lines of the other card when reversed on the support.

8. In a music educational appliance of the character described, a horizontally extending card-supporting guide, and a plurality of cards loosely supported on the guides for relative movement thereon, each card having staff lines impressed thereon, the lower and upper staff lines being equal distances from the lower and upper edges of the cards whereby the inversion of any one of the cards on the guide will cause its staff lines to register with those of the remaining cards.

9. In a music educational appliance of the character described, a horizontally extending card-supporting guide, and a plurality of cards loosely supported on the guides for relative movement thereon, each card having staff lines impressed on opposite faces thereof with their lower and upper staff lines equal distances from the lower and upper edges of the cards whereby the inversion or reversal of any one of the cards on the guide will bring its staff lines into registration with those of the other cards.

10. In a music educational appliance of the character described, a horizontally extending display board having a lengthwise card-supporting guide, separate cards loosely supported upon the guide for relative lengthwise movement, reversal and inversion thereon, each card having its opposite faces provided with staff lines and different groups of notes on its staff, the lower and upper staff lines being equal distances from the opposite lengthwise edges of the card.

11. In a music educational appliance of the character described, a horizontally extending display board having a card-supporting guide and a bar-supporting guide in vertically spaced parallel relation, cards loosely supported on the first-named guide for relative adjustment thereon and each provided with a group of notes on its surface, and note-grouping-bars slidable along and upon the second-named guide across the surfaces of the cards bearing the note groups for dividing the notes of the group of each card to embrace notes of different groups on different cards.

In witness whereof I have hereunto set my hand this 6th day of February, 1926.

EDWARD E. SCOVILL.